(12) United States Patent
Korzhenko et al.

(10) Patent No.: US 11,214,523 B2
(45) Date of Patent: Jan. 4, 2022

(54) PROCESS FOR PRODUCING HIGHLY CARBONACEOUS MATERIALS AND THE HIGHLY CARBONACEOUS MATERIAL OBTAINED

(71) Applicant: Arkema France, Colombes (FR)

(72) Inventors: Alexander Korzhenko, Pau (FR); Célia Mercader, Pau (FR)

(73) Assignee: ARKEMA FRANCE, Colombes (FR)

(*) Notice: Subject to any disclaimer, the term of this patent is extended or adjusted under 35 U.S.C. 154(b) by 11 days.

(21) Appl. No.: 16/344,976

(22) PCT Filed: Oct. 26, 2017

(86) PCT No.: PCT/FR2017/052949
§ 371 (c)(1),
(2) Date: Apr. 25, 2019

(87) PCT Pub. No.: WO2018/078287
PCT Pub. Date: May 3, 2018

(65) Prior Publication Data
US 2019/0270678 A1 Sep. 5, 2019

(30) Foreign Application Priority Data
Oct. 28, 2016 (FR) ...................................... 1660536

(51) Int. Cl.
*C04B 35/83* (2006.01)
*H01M 4/1393* (2010.01)
(Continued)

(52) U.S. Cl.
CPC ........ *C04B 35/83* (2013.01); *C04B 35/62204* (2013.01); *C04B 35/62209* (2013.01);
(Continued)

(58) Field of Classification Search
CPC . C04B 35/83; C04B 35/628; C04B 35/62272; C04B 35/62204;
(Continued)

(56) References Cited

U.S. PATENT DOCUMENTS 6,720,057 B1    4/2004   Neumayr et al.
7,824,651 B2   11/2010   Zhamu et al.
(Continued)

FOREIGN PATENT DOCUMENTS

CN      1587457 A    3/2005
FR      2994968 A1   3/2014
(Continued)

OTHER PUBLICATIONS

Office Action issued by the U.S. Patent and Trademark Office in the U.S. Appl. No. 16/344,956 dated May 14, 2020, U.S. Patent and Trademark Office, Alexandria, VA. (16 pages).
(Continued)

*Primary Examiner* — Alexander Usyatinsky
(74) *Attorney, Agent, or Firm* — Buchanan Ingersoll & Rooney P.C.

(57) ABSTRACT

A process for the production of highly carbonaceous material, including combining a structured precursor including fibres and an unstructured precursor, in the form of a fluid, wherein the fluid has a viscosity of less than 45,000 mPa·s$^{-1}$ at the temperature at which the combination step occurs, and including at least a cyclic organic or aromatic compound in the molten state, or in solution at a concentration by weight of less than or equal to 65%, in order to obtain a combined precursor corresponding to the structured precursor covered by the unstructured precursor, wherein the process further includes step of thermal and dimensional stabilization of the combined precursor in order to obtain fibres covered with a cyclic organic or aromatic compound deposit, and a step of
(Continued)

carbonization of the fibres covered with a cyclic organic or aromatic compound deposit in order to obtain a highly carbonaceous material.

14 Claims, 2 Drawing Sheets

(51) Int. Cl.
| | |
|---|---|
| *C04B 35/628* | (2006.01) |
| *D01F 9/17* | (2006.01) |
| *H01M 4/587* | (2010.01) |
| *C04B 35/622* | (2006.01) |
| *C04B 38/00* | (2006.01) |
| *D01F 9/16* | (2006.01) |
| *H01M 4/133* | (2010.01) |
| *H01M 4/36* | (2006.01) |
| *C04B 111/00* | (2006.01) |

(52) U.S. Cl.
CPC .. *C04B 35/62272* (2013.01); *C04B 35/62873* (2013.01); *C04B 38/00* (2013.01); *C04B 38/0022* (2013.01); *D01F 9/16* (2013.01); *D01F 9/17* (2013.01); *H01M 4/133* (2013.01); *H01M 4/1393* (2013.01); *H01M 4/362* (2013.01); *H01M 4/587* (2013.01); *C04B 2111/0081* (2013.01); *C04B 2111/00853* (2013.01); *C04B 2235/40* (2013.01); *C04B 2235/404* (2013.01); *C04B 2235/405* (2013.01); *C04B 2235/424* (2013.01); *C04B 2235/425* (2013.01); *C04B 2235/428* (2013.01); *C04B 2235/48* (2013.01); *C04B 2235/5264* (2013.01); *C04B 2235/5288* (2013.01); *C04B 2235/5454* (2013.01); *C04B 2235/616* (2013.01); *C04B 2235/6567* (2013.01); *C04B 2235/77* (2013.01)

(58) Field of Classification Search
CPC .......... C04B 38/0022; C04B 35/62209; C04B 35/62873; C04B 38/0074; C04B 2235/528; C04B 2111/00853; C04B 2235/6567; C04B 2235/425; C04B 2235/405; C04B 2235/5264; C04B 2235/428; C04B 2235/40; C04B 2235/77; C04B 2235/48; C04B 2235/424; C04B 2235/5454; C04B 2111/0081; C04B 2235/616; C04B 2235/404; D01F 9/17; D01F 9/16; H01M 4/1393; H01M 4/587; H01M 4/133; H01M 4/362; Y02E 60/10
See application file for complete search history.

(56) References Cited

U.S. PATENT DOCUMENTS

| | | | | |
|---|---|---|---|---|
| 9,006,327 | B2* | 4/2015 | Piccione | B82Y 30/00 524/495 |
| 9,909,235 | B2* | 3/2018 | Korzhenko | D01F 1/10 |
| 2004/0234445 | A1 | 11/2004 | Serp et al. | |
| 2007/0087120 | A1* | 4/2007 | Connors | C04B 35/83 427/228 |
| 2009/0121380 | A1 | 5/2009 | Olry et al. | |
| 2011/0285049 | A1* | 11/2011 | Baker | B29C 48/11 264/105 |
| 2012/0077403 | A1* | 3/2012 | Gaillard | D01F 1/09 442/200 |
| 2013/0087552 | A1* | 4/2013 | Lee | D06M 11/74 219/553 |
| 2014/0065909 | A1* | 3/2014 | Lee | D01F 9/16 442/136 |
| 2015/0292118 | A1* | 10/2015 | Korzhenko | D01F 1/10 423/447.2 |
| 2016/0122515 | A1 | 5/2016 | Karampelas | |
| 2019/0027068 | A1 | 1/2019 | Kingsley | |

FOREIGN PATENT DOCUMENTS

| | | |
|---|---|---|
| FR | 2997097 A1 | 4/2014 |
| KR | 20120082287 A | 7/2012 |
| WO | 03002456 A2 | 1/2003 |
| WO | 2014064373 A1 | 5/2014 |

OTHER PUBLICATIONS

International Search Report (PCT/ISA/210) dated Dec. 7, 2017, by the European Patent Office as the International Searching Authority for International Application No. PCT/FR2017/052952.
International Search Report (PCT/ISA/210) dated Feb. 9, 2018, by the European Patent Office as the International Searching Authority for International Application No. PCT/FR2017/052949.
Written Opinion (PCT/ISA/237) dated Dec. 7, 2017, by the European Patent Office as the International Searching Authority for International Application No. PCT/FR2017/052952.
Written Opinion (PCT/ISA/237) dated Feb. 9, 2018, by the European Patent Office as the International Searching Authority for International Application No. PCT/FR2017/052949.

* cited by examiner

PROCESS FOR PRODUCING HIGHLY CARBONACEOUS MATERIALS AND THE HIGHLY CARBONACEOUS MATERIAL OBTAINED

The invention relates to the field of highly carbonaceous materials for the production of parts made of composite materials or parts that may be used in electrochemical processes. The invention relates to a process of producing a highly carbonaceous material and the highly carbonaceous material obtainable by such a production process.

BACKGROUND

The carbon fibre market is booming. In recent years, the carbon fibre industry has grown steadily to meet the demands of various applications. The market is currently estimated at around 60 kt/y and is expected to grow to 150-200 kt/y by 2020-2025. This strong forecast growth is mainly related to the introduction of carbon fibre in composite materials used in the aerospace, energy, building, automotive and leisure sectors.

Carbon fibres generally offer excellent tensile properties, high thermal and chemical stability, good thermal and electrical conductivities, and excellent resistance to deformation. They may be used as reinforcements of composite materials which usually comprise a polymer resin (matrix). The composite materials thus reinforced exhibit excellent physical properties while maintaining an advantageous lightness. Increased lightness is one of the key measures for reducing $CO_2$ emissions for transport. The automotive and aerospace industry has increasing demand for compounds offering a greater lightness for equivalent performance. In this context, the automotive and aerospace sectors, and more broadly industry itself, also need high-performance materials, but at contained costs.

Furthermore, carbon fibres are also being developed in the field of electrochemistry due to several qualities such as their high electrical conductivity and flexibility in terms of size and shape. Nevertheless, in this field, carbon fibres still suffer from drawbacks related to their low concentration of metal fillers. There is therefore still a need for 3D structures with high conductivity and a high concentration of metal fillers to create an economical alternative to porous metals.

Today, carbon fibres are mainly made from acrylic precursors. Polyacrylonitrile (PAN) is the precursor most widely used today for the production of carbon fibres. In brief, the production of carbon fibres from PAN includes the polymerization steps of PAN-based precursors, fibre spinning, thermal stabilization, carbonization and graphitization. The carbonization takes place under a nitrogen atmosphere at a temperature of 1000 to 1500° C. The carbon fibres obtained at the end of these steps consist of 90% carbon, about 8% nitrogen, 1% oxygen and less than 1% hydrogen. Precursors based on pitch have also been developed but, like acrylic precursors, they consume fossil resources.

With the objective of reducing the price of carbon fibre, one of the proposed solutions has been to replace the precursors derived from petroleum (e.g. PAN or pitch) by biosourced materials, such as cellulose or lignin, contained in wood. The cost price for the production of carbon fibre using cellulose as a precursor is much lower than that of fibres with PAN. In this regard, several cellulosic precursors have been evaluated. Cellulose-based precursors have the advantage of producing well-structured carbon structures, but generally fail to achieve satisfactory carbon yields. However, the document WO2014064373 filed by the Applicant describes a process of producing, from a biosourced precursor, carbon fibre continuously doped with carbon nanotubes (CNT). The presence of CNT in the biosourced precursor makes it possible to increase the carbon yield of the precursor during carbonization, and also to increase the mechanical characteristics of the carbon fibres. The biosourced precursor may be cellulose transformed in the form of fibres by dissolution and coagulation/spinning, in order to form hydrocellulose (such as, for example, viscose, lyocell, rayon). The process may comprise a sizing step before carbonization.

FR2994968 discloses the production of a carbon-based composite material comprising a carbon fibre based on lyocell and a carbon matrix. Nevertheless, the process disclosed in this document requires the use of a carbon fibre which involves the implementation of several steps including several carbonizations. KR 20120082287 also discloses a process for producing carbon fibre from a precursor material comprising lyocell (cellulosic fibres from wood or bamboo) and a nanocomposite material—graphenes. CN1587457 discloses a process for preparing a cellulosic precursor material for the production of carbon fibre offering improved properties and a lower production cost. The cellulosic preparation involves inserting the soot nanoparticles into the cellulosic solution. Nevertheless, these processes do not allow an improvement in the carbon yield or an increase in the porosity of the materials obtained. US2009121380 discloses a process for obtaining carbon fibre texture without using solvents based on cellulosic precursor by being spun and impregnated with an aqueous emulsion comprising an organosilicon additive.

The Applicant has noted that there is still a need for precursors used in carbon-based material production processes that are capable of responding to problems encountered with existing methods and allowing: i) a high carbon yield; ii) a combination of stable 3D structure and increased porosity; iii) reduced production costs.

Technical Problem

The invention therefore aims to overcome the drawbacks of the prior art. In particular, the object of the invention is to propose a process of producing a highly carbonaceous material that is very mechanically stable offering improved carbon yield. In addition, this highly carbonaceous material offers a higher porosity than carbon fibres, allowing it to be more effectively combined with metals.

BRIEF DESCRIPTION OF THE INVENTION

Thus, the invention relates to a process for the production of highly carbonaceous material, characterized in that it comprises the combination of a structured precursor comprising a fibre or a set of fibres, and an unstructured precursor in the form of a fluid, wherein the fluid preferably has a viscosity of less than 45,000 mPa·s$^{-1}$ at the temperature at which the combining step takes place, and comprising at least one cyclic or aromatic organic compound in the molten state or in solution at a weight concentration of less than or equal to 65%, in order to obtain a combined precursor corresponding to the structured precursor covered by the unstructured precursor, wherein the process further comprises the following steps:
 a step of thermal and dimensional stabilization of the combined precursor in order to obtain a fibre or a set of fibres covered with a cyclic or aromatic organic compound deposit, and a step of carbonizing the fibre or set of fibres covered with a cyclic or aromatic organic compound deposit in order to obtain a highly carbonaceous material.

This new process for producing a highly carbonaceous material has many advantages such as obtaining a higher carbon yield than that observed with the processes of the prior art, the formation of a material offering high porosity while retaining a structured part, and the possibility of adding additional compounds to thereby obtain a highly carbonaceous material with improved properties.

The invention further relates to a fibre or a set of fibres covered with a cyclic or aromatic organic compound deposit as an intermediate product, obtained after the thermal and dimensional stabilization step of the production process according to the invention. This intermediate product advantageously has a ratio of the weight of fibre(s) to the weight of cyclic or aromatic organic compound of between 1/5 and 100/1.

The invention further relates to a highly carbonaceous material obtained by the process according to the invention. Advantageously, this highly carbonaceous material is bi-structured in order to comprise a structured part and an unstructured part, while offering an overall porosity greater than 5%, preferably greater than 10%. These products meet the expectations of manufacturers looking for carbon materials having a high porosity while maintaining a structured portion.

The invention further relates to the use of the highly carbonaceous material according to the invention for the production of parts made of thermoplastic or thermosetting composite materials.

The invention further relates to the use of the highly carbonaceous material according to the invention for the production of parts that may be used in electrochemical processes.

BRIEF DESCRIPTION OF THE DRAWINGS

Other advantages and features of the invention will become apparent upon reading the following description given by way of an illustrative and non-limiting example, with reference to the appended figures, wherein:

FIG. 2A shows a carbonaceous material comprising a hydrocellulose fibre treated with DAHP (diammonium hydrogen phosphate), while FIG. 2B shows a highly carbonaceous material comprising a hydrocellulose fibre treated with lignin according to the process of the invention.

DETAILED DESCRIPTION

Figure 1:
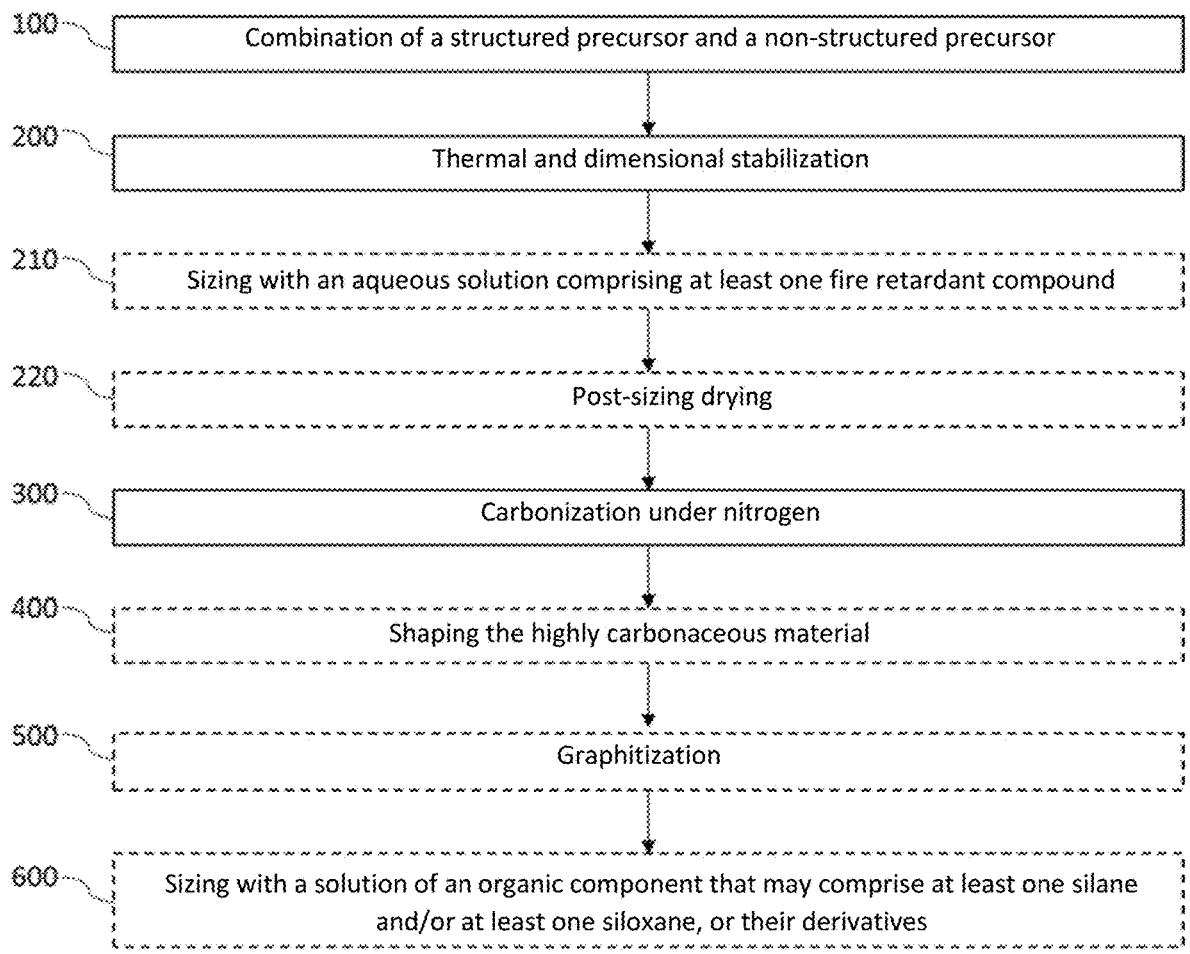
FIG. 1 shows a diagram of an embodiment of the process for producing a highly carbonaceous material according to the invention. The dotted steps are optional.

The term "carbonaceous nanofillers" according to the invention is understood to mean a filler comprising an element of the group consisting of carbon nanotubes, carbon nanofibers, graphene, fullerenes and carbon black, or a mixture of these in all proportions. Preferably, the carbon nanofillers are carbon nanotubes, alone or mixed with graphene. This carbonaceous filler may have a smaller dimension of between 0.1 to 200 nm, preferably between 0.1 and 160 nm, more preferably between 0.1 and 50 nm. This dimension may be measured by light scattering.

The term "graphene" according to the invention is understood to mean a flat graphite sheet, isolated and individualized, but also, by extension, an assembly comprising between one and a few tens of sheets and having a flat or more or less wavy structure. This definition therefore includes FLG (Few Layer Graphene), NGP (Nanosized Graphene Plates), CNS (Carbon NanoSheets), GNR (Graphene NanoRibbons). On the other hand, it excludes carbon nanotubes and nanofibers, which respectively consist of the winding of one or more sheets of graphene in a coaxial manner and the turbostratic stacking of these sheets.

The term "highly carbonaceous material" according to the invention is understood to mean a material whose carbon weight represents more than 80% of the total weight of the non-metallic elements, preferably more than 90%, more preferably more than 95%, and even more preferably more than 98% (materials considered to be materials of very high purity).

The term "hydrocellulose fibre" according to the invention is understood to mean cellulose fibres or cellulose derivatives, preferably of continuous and regular diameter, obtained after dissolution of cellulose from lignocellulosic material. As will be detailed in the rest of the text, this combination may be achieved by several alternative methods. The hydrocellulose may, for example, be obtained after treatment with sodium hydroxide followed by dissolution with carbon disulphide. In this case, the hydrocellulose is more particularly called viscose. Alternatively, the hydrocellulose fibre may be obtained from lignocellulosic material dissolved in a solution comprising N-methylmorpholine N-oxide to form lyocell.

The term "lignin" according to the invention is understood to mean a plant aromatic polymer the composition of which varies with the plant species and is generally formed from three phenylpropanoid monomers: p-coumaryl, coniferyl and sinapyl alcohols.

The term "lignin derivative" according to the invention is understood to mean a molecule having a lignin-type molecular structure, and may comprise substituents having been added during the lignin extraction process or later, in order to modify its physicochemical properties. There are many processes for extracting lignin from lignocellulosic biomass and these may lead to lignin modifications. For example, the Kraft process uses a strong base with sodium sulphide to separate lignin from cellulose fibres. This process can form thio-lignins. The sulphite process, resulting in the formation of lignosulphonates. The organo solvent pretreatment processes use an organic solvent or mixtures of organic solvents with water to solubilize the lignin prior to the enzymatic hydrolysis of the cellulosic fraction. Preferably, lignin derivative is understood to mean a lignin having substituents that may be selected from: thiol, sulphonate, alkyl, or polyester. The lignins or lignin derivatives used in the context of the present invention generally have a molecular weight greater than 1000 g/mol, for example greater than 10,000 g/mol.

In the following description, the same references are used to designate the same elements.

According to a first aspect, the invention relates to a process of production 1 of a highly carbonaceous material 2, characterized in that it comprises the combination 100 of a structured precursor 10 comprising a fibre or a set of fibres and an unstructured precursor 15, in the form of a fluid, wherein the fluid preferably has a viscosity of less than 45,000 mPa·s$^{-1}$ at the temperature at which the combining step occurs, and comprising at least one cyclic or aromatic organic compound in the molten state or in solution at a weight concentration of less than or equal to 65%.

This combination step 100 makes it possible to obtain a combined precursor 20 corresponding to the structured precursor 10 covered by the unstructured precursor 15.

An embodiment of this process is shown schematically in FIG. 1. It may be carried out continuously or discontinuously. In the context of a continuous production, the industrial processes allow the chaining of the various steps without interruption.

Structured Precursor (10)

The structured precursor 10 comprises a fibre or a set of fibres. The fibre or set of fibres may have undergone pretreatments to facilitate their handling in the context of the process according to the invention. Nevertheless, when used as a precursor, this fibre or set of fibres has not undergone a carbonization step. Thus the fibre or set of fibres used in the structured precursor 10 preferably has a carbon weight concentration of less than 75%, advantageously less than 65%.

Preferably, these fibres are cellulose fibres, hydrocellulose fibres, lignin fibres, pitch fibres or acrylic precursor fibres (for example PAN). Even more preferably, the structured precursor 10 may comprise a natural fibre or a set of natural fibres. The natural fibre is obtained from at least one plant component, preferably cellulose, selected from wood cellulose, flax, hemp, ramie, bamboo and preferably wood cellulose or lignocellulose, a combination of cellulose and lignin, as in wood fibres, jute, cereal straw, corn stalks, cork or lignin. This fibre may be obtained by various known production processes.

Advantageously, the natural fibres are obtained from a cellulose solution; and then extruded through a die to form a continuous fibre such as a hydrocellulose fibre, or obtained from lignin after extrusion to form a lignin fibre.

In the case of a hydrocellulose fibre, it may, for example, be obtained according to the production process described in the application WO2014064373. The hydrocellulose fibres used may also be lyocell or viscose fibres, the cellulose of which comes, for example, from wood or bamboo. Most of the processes for producing hydrocellulose fibres are based on the production of a cellulosic preparation from dissolved cellulose, for example carbon disulphide, 4-methylmorpholine 4-oxide (N-Methylmorpholine-N-oxide—NMMO) or in an acid solution (e.g. ortho-phosphoric acid or acetic acid), which is then used to form the continuous hydrocellulose fibres following immersion in a coagulation bath containing, for example, sulphuric acid. The hydrocellulose fibre used in the process of the present invention as a precursor has not been previously carbonized.

In addition, this fibre or this set of fibres may take very different forms. One of the advantages of the invention is that the process may be implemented with fibres that have been previously formed, for example, in the form of a twisted multi-filament, a non-twisted multi-filament, a set of nonwoven fibres, or a set of woven fibres. In the production of carbon fibre fabrics, it is usually necessary to produce carbon fibre coils, for example from carbonized PAN and then to organize these fibres according to the desired weavings. Here, the invention makes it possible to use directly non-carbonized fibres that have been previously organized, in the form of a multi-filament or set of fibres. Thus, the process according to the invention has the advantage of reducing the producing costs of multi-filaments or sets of carbon fibre (for example, woven). For example, in the context of the process according to the invention, it is possible to produce a set of woven fibres (e.g. viscose, lyocell, rayon, oxidized PAN) and to directly subject it to the production process according to the invention to form a highly carbonaceous material having a structured part such as a woven set of carbon fibres. Thus the structured precursor 10 preferably comprises a multi-filament or a set of fibres. Even more preferably, the structured precursor 10 may be a twisted multi-filament, a non-twisted multi-filament, a set of non-woven fibres, or a set of woven fibres.

The twisted multi-filaments that may be used according to the invention have, for example, a number of turns per meter between 5 and 2000 turns per meter, preferably between 10 and 1000 turns per meter.

The structured precursor 10 according to the invention may comprise at least one fibre whose diameter is between 0.5 μm and 300 μm, preferably between 1 μm and 50 μm. In addition, the structured precursor 10 according to the invention preferably comprises at least one continuous fibre having a regular diameter over its entire length, and, in particular, the absence of fibril. This improves the cohesion between the cyclic or aromatic organic compound deposit and the fibre. By regular diameter, it should be understood that the diameter varies from less than 20%, preferably less than 10% over the length of the fibre.

Unstructured Precursor (15)

The unstructured precursor 15 is in the form of a fluid comprising at least one cyclic or aromatic organic compound in the molten state or in solution at a weight concentration of less than or equal to 65%. The use of the unstructured precursor in the form of a fluid makes it possible to improve the combination 100 between the unstructured precursor 15 and the structured precursor 10.

The fluid may be an aqueous solution, or an organic solution or a mixture of both. These alternatives make it possible to adapt the unstructured precursor 15 according to the cyclic or aromatic organic compound used, as well as any added additives. Preferably, the fluid is a mixture of water and an organic solvent.

Alternatively, the fluid may be a melted material such as melted lignin. This is particularly suitable when the cyclic or aromatic organic compound used is not soluble, or not very soluble but fusible.

The cyclic or aromatic organic compound may be in different forms in the fluid. It may be solubilized in the solution, melted or in the solid state in the form of a dispersion. This dispersion may be carried out in a solution as well as in a material in the melted state. Preferably, the cyclic or aromatic organic compounds that are neither fusible nor soluble will be combined with the structured precursor in the form of a dispersion.

Preferably, the fluid has a viscosity of less than 45,000 $mPa \cdot s^{-1}$ at the temperature at which the combination step 100 takes place. This makes it possible, during the combination step, to associate a larger quantity of unstructured precursor 15 with the structured precursor 10, and to increase the porosity of the highly carbonaceous material 2 obtained/. Advantageously, the fluid has a viscosity greater than 500 $mPa \cdot s^{-1}$ and less than 45,000 $mPa \cdot s^{-1}$, preferably it has a viscosity greater than 1,000 $mPa \cdot s^{-1}$ and less than 45,000 $mPa \cdot s^{-1}$. This viscosity range corresponds to a viscosity adapted to the technologies used for the combination step, in particular the impregnation, and allows better control of the amount of fluid deposited during this step. A viscosity greater than 500 $mPa \cdot s^{-1}$ makes it possible to improve the carbon yield of the highly carbonaceous material obtained compared with a lower viscosity. The viscosity of the fluid is measured at the temperature at which the combination step 100 takes place, for example by means of a free-flowing viscometer or capillary viscosity or the Brookfield method.

The cyclic or aromatic organic compound is an organic material which, following pyrolysis under an oxygen-free atmosphere, is converted into a carbon residue preferably representing more than 5% by weight of the highly carbonaceous material 2 obtained in the context of the invention. A cyclic or aromatic organic compound according to the invention comprises a series of atoms successively linked by covalent bonds to form one or more rings. This cycle may be saturated or unsaturated and this ring may be a heterocycle. Preferably, the cyclic or aromatic organic compound is an aromatic compound. Namely, it has at least one aromatic ring. Preferably, the cyclic or aromatic organic compound has a weight percentage of carbon greater than 40%, more preferably greater than 45%, even more preferably greater than 60%. This enables it to increase the carbon yield of the highly carbonaceous material 2 optimally. Thus, compounds such as siloxanes or polysiloxanes would not make it possible to increase the carbon yield as efficiently as a cyclic or aromatic organic compound having a percentage weight of carbon greater than 40%.

The cyclic or aromatic organic compound may be selected from:
- biosourced products selected from: lignin or lignin derivatives, polysaccharides such as cellulose, starch, glycogen, amylose, amylopectin, dextran, hemicellulose, or other simpler sugars such as fructose or glucose and their derivatives;
- products obtained from petroleum or mining resources selected from: pitch, naphthalene, phenanthrene, anthracene, pyrene or substituted polycyclic aromatic hydrocarbons such as naphthalene sulphonate;
- synthetic products selected from phenolic resin, phenoplast resin, or polyepoxide resin; and
- any other substances or organic formulations producing a carbon residue following pyrolysis under an inert atmosphere.

Preferably, the cyclic or aromatic organic compound is an oligomer or a cyclic or aromatic organic polymer.

Advantageously, the cyclic or aromatic organic compound has a molecular weight greater than 500 g/mol, preferably greater than 1000 g/mol, and even more preferably greater than 5000 g/mol.

Even more preferably, the cyclic or aromatic organic compound is lignin or a lignin derivative.

The unstructured precursor 15 may comprise a number of different cyclic or aromatic organic compounds.

In solution, the cyclic or aromatic organic compound has a weight concentration less than or equal to 65%. Too high a solution concentration of cyclic or aromatic organic compound could reduce the properties of the highly carbonaceous material obtained. Preferably, the unstructured precursor comprises between 5 and 50% by weight of cyclic or aromatic organic compound. At such concentrations, the structured precursor fibres are entirely covered with cyclic or aromatic organic compound.

Advantageously, the unstructured precursor 15 comprises lignin or a lignin derivative. In fact, lignin represents 10 to 25% of terrestrial biomass of lignocellulosic nature and it is currently little exploited by the industry. Thus, each year, several hundred tons of lignin or lignin derivatives are produced without any possible use. Lignin is present mainly in vascular plants (or higher plants) and in some algae. It is a plant aromatic polymer the composition of which varies with the plant species and is generally formed from three phenylpropanoid monomers: p-coumaryl, sinapyl and coniferyl alcohols, as illustrated by the formulas below:

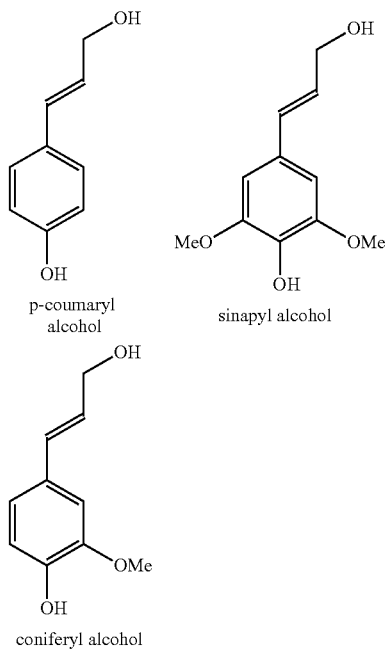

p-coumaryl alcohol sinapyl alcohol coniferyl alcohol

Advantageously, the unstructured precursor 15 may further comprise at least one additional compound selected from: a metal filler, carbon-rich compounds and organic particles. The addition of additional compounds to the unstructured precursor 15 makes it possible to benefit from the binding properties of the cyclic or aromatic organic compound and to form a highly carbonaceous material 2 with multiple properties.

The metal filler may, for example, comprise metalloids such as boron, silicon, germanium, arsenic; alkali metals such as lithium, sodium, potassium; transition metals such as titanium, vanadium, manganese, iron, cobalt, nickel, molybdenum; poor metals such as aluminium or lead; or halogens such as fluorine, chlorine, or bromine. Preferably, the metal filler may comprise at least one metal selected from the following metals: boron, silicon, germanium, arsenic, lithium, sodium, potassium, titanium, vanadium, manganese, iron, cobalt, nickel, molybdenum, aluminium and lead. These metals may be used, alone or as a mixture, in any form such as, for example, in the form of an oxide, a hydroxide or an acid, or else in the form of salts such as organic salts (for example nitrate salts, sulphate, acetate, carbonate, oxalate, benzoate or phosphates). The unstructured precursor 15 contains, for example, a metal filler and a cyclic or aromatic organic compound. The cyclic or aromatic organic compound then plays the dual role of porous matrix and binder allowing the fixation of a large amount of metals.

The addition of such metals to the unstructured precursor 15 allows highly carbonaceous materials 2 according to the invention to achieve the physicochemical properties sought, for example, in the case of applications in electrochemistry.

Preferably, the unstructured precursor 15 comprises several different metals. For example, the unstructured precursor 15 may include lithium, cobalt, and nickel.

The carbon-rich compounds may be selected from the following compounds: activated carbon, natural anthracite, synthetic anthracite, carbon black, natural graphite or synthetic graphite. The organic particles may be selected from the following compounds: nanocellulose (for example: cellulose nanofibers, cellulose microfibrils, cellulose nanocrystals, nanocellulose whiskers or bacterial nanocellulose), tannins, chitosan, or other biopolymers that are neither fusible nor soluble. Such carbon-rich compounds or organic particles added to the unstructured precursor make it possible to increase the carbon yield of the material obtained and to improve its mechanical properties. The compounds that are neither fusible nor soluble may be added in the form of a dispersion.

Preferably, the unstructured precursor 15 may comprise between 0.001% and 50% by weight of additional compound. More preferably, it may comprise from 0.001% to 30% by weight of carbon-rich compounds, from 0.001% to 50% by weight of organic particles, or a mixture thereof in any proportion.

Advantageously, the structured precursor 10 and/or the unstructured precursor 15 may comprise carbon nanofillers, wherein the carbon nanofillers are present at a concentration of between 0.0001% and 30% by weight. Preferably, these carbon nanofillers are present at a concentration of between 0.01% and 5% by weight. The addition of carbon nanofillers to one or both of the precursors makes it possible to improve the carbon yield of the highly carbonaceous material obtained. In fact, when carbon nanofillers are added to the unstructured precursor 15, the latter acts as a binder and results in an increase in the amount of carbon nanofillers being effectively inserted in the resulting material.

The carbon nanotubes (CNT) may be of the single wall, double wall, or multiple wall type. Double-walled nanotubes may, in particular, be prepared as described by FLAHAUT et al in Chem. Com. (2003), 1442. The multi-walled nanotubes may themselves be prepared as described in WO 03/02456. The nanotubes usually have an average diameter ranging from 0.1 to 100 nm, preferably from 0.4 to 50 nm, and better still from 1 to 30 nm, in fact from 10 to 15 nm, and advantageously a length of 0.1. at 10 μm. Their length/diameter ratio is preferably greater than 10 and most often greater than 100. Their specific surface area is, for example, between 100 and 300 m$^2$/g, advantageously between 200 and 300 m$^2$/g, while their apparent density may be, in particular, between 0.05 and 0.5 g/cm$^3$, and more preferably between 0.1 and 0.2 g/cm$^3$. Multiwall nanotubes may, for example, comprise from 5 to 15 sheets (or walls) and more preferably from 7 to 10 sheets.

An example of crude carbon nanotubes is, in particular, commercially available from ARKEMA under the trade name Graphistrength® C100. Alternatively, these nanotubes may be purified and/or treated (for example oxidized) and/or milled and/or functionalized before being used in the process according to the invention. The purification of the crude or milled nanotubes may be carried out by washing with a sulphuric acid solution, in order to rid them of any residual mineral and metal impurities. The oxidation of the nanotubes is advantageously carried out by putting them in contact with a solution of sodium hypochlorite. The functionalization of the nanotubes may be carried out by grafting reactive units such as vinyl monomers on the surface of the nanotubes.

The graphene used in the process may be obtained by chemical vapour deposition (CVD), preferably in a process using a powder catalyst based on a mixed oxide. This is typically in the form of particles having a thickness of less than 50 nm, preferably less than 15 nm, more preferably less than 5 nm, and less than one micron lateral dimensions, from 10 to 1000 nm. preferably from 50 to 600 nm, and more preferably from 100 to 400 nm. Each of these particles generally contains from 1 to 50 sheets, preferably from 1 to 20 sheets and more preferably from 1 to 10 sheets. Various processes for the production of graphene have been proposed in the literature, including the so-called mechanical exfoliation and chemical exfoliation processes, consisting in tearing off graphite sheets in successive layers, respectively by means of an adhesive strip (Geim A. K., Science, 306: 666, 2004), or by using reagents, such as sulphuric acid combined with nitric acid, interposed between the layers of graphite and the oxidant, in order to form graphite oxide that may be easily exfoliated in water in the presence of ultrasound. Another exfoliation technique involves subjecting graphite solution to ultrasound in the presence of a surfactant (U.S. Pat. No. 7,824,651). It is also possible to obtain graphene particles by cutting carbon nanotubes along the longitudinal axis ("Micro-Wave Synthesis of Large Few-Layer Graphene Sheets in Aqueous Solution of Ammonia", Janowska, I. et al, NanoResearch, 2009 or "Narrow Graphene nanoribbons from Carbon Nanotubes", Jiao L. et al, Nature, 458: 877-880, 2009). Still another method of producing graphene is to decompose silicon carbide at high temperature, under vacuum. Finally, several authors have described a process for the synthesis of graphene by chemical vapour deposition (CVD), possibly associated with a radio frequency generator (RF-CVD) (DERVISHI et al., J. Mater Sci., 47): 1910-1919, 2012).

Fullerenes are molecules composed exclusively, or almost exclusively, of carbon that may take a geometric shape reminiscent of a sphere, an ellipsoid, a tube (called nanotube) or a ring. Fullerenes may, for example, be selected from: fullerene C60 which is a compound of 60 carbon atoms of spherical form, C70, PCBM of formula [6,6]-phenyl-C61-methyl butyrate which is a fullerene derivative, whose chemical structure has been modified to make it soluble, and the PC 71 of methyl [6,6]-phenyl-C71-butyrate methyl.

Carbon nanofibers are, like carbon nanotubes, nanofilaments produced by chemical vapour deposition (CVD) from a carbon source which is decomposed on a catalyst comprising a transition metal (Fe, Ni, Co, Cu) in the presence of hydrogen, at temperatures of 500 to 1200° C. Carbon nanofibers consist of more or less organized graphitic zones (or turbostratic stacks), the planes of which are inclined at variable angles with respect to the axis of the fibre. These stacks may take the form of platelets, fish bones or stacked cups to form structures that generally range in diameter from 100 nm to 500 nm or more. Carbon nanofibers having a diameter of 100 to 200 nm, for example about 150 nm (VGCF® from SHOWA DENKO), and advantageously a length of 100 to 200 μm, are preferred in the process according to the invention.

Furthermore, it is possible to use carbon black as carbon nanofibers, which is a colloidal carbon material produced industrially by incomplete combustion of heavy petroleum products and which is in the form of carbon spheres and aggregates of these spheres the dimensions of which are generally between 10 and 1000 nm.

Combination (100)

The combination step 100 according to the invention corresponds to the contacting of the structured precursor 10 with the unstructured precursor 15. This combination may be carried out by several alternative methods, generally at a temperature ranging from −10° C. to 80° C., preferably from 20° C. to 60° C. For example, it is possible to carry out soaking, spraying or impregnation (for example by padding). Preferably, the combination step 100 is an impregnation.

Thermal and Dimensional Stabilization (200)

The production process 1 according to the invention further comprises a thermal and dimensional stabilization step 200 of the combined precursor 20 in order to obtain a fibre or a set of fibres covered with a cyclic or aromatic organic compound deposit 30.

The thermal and dimensional stabilization step 200 may comprise drying allowing the evaporation of the solvent and/or ventilation. The drying may be carried out via a rise in temperature, for example between 50° C. and 250° C. for a period of preferably 1 to 30 minutes. In fact, when the structured precursor is treated with an unstructured precursor comprising a diluent or organic solvent, it is desirable to remove the diluent or solvent subsequently, and, for example, to subject this article to heat treatment in order to expel the diluent or the solvent in the form of steam. For example, an infrared oven with ventilation may be used.

Following this step, a deposit, similar to a solid film, of cyclic or aromatic organic compound is formed on the surface of the fibre. This deposit may have varying thicknesses depending on the parameters used in the process such as the viscosity of the solution or the concentration of cyclic or aromatic organic compound.

Preferably, the combination step 100 and thermal and dimensional stabilization step 200 may be repeated one or more times. Repetition of these steps makes it possible to increase the amount of cyclic or aromatic organic compound deposited on the fibre or set of fibres. It is thus possible to increase the carbon yield, to increase the diameter of the fibres obtained and/or to increase the porosity of the highly carbonaceous material obtained at the end of the process.

Carbonization (300)

The production process 1 according to the invention further comprises a step 300 of carbonization of the fibre or set of fibres covered with a cyclic or aromatic organic compound deposit 30 in order to obtain a highly carbonaceous material 2.

This carbonization step 300 may be carried out at a temperature between 150° C. and 2500° C., preferably between 250 and 1400° C. The carbonization step 300 may, for example, last 2 to 60 minutes. This carbonization step may comprise a progressive rise in temperature or a rise and fall in temperature. The carbonization takes place in the absence of oxygen and preferably under a nitrogen atmosphere. The presence of oxygen during carbonization should be limited preferably to 5 ppm.

This carbonization step may be carried out continuously and may be coupled to a drawing step of the fibre in order to improve the mechanical properties of the carbon fibre obtained.

Pre-Carbonization Sizing (210)

The production process according to the invention may further comprise the following steps before the carbonization step 300:
   a sizing step 210 of contacting the fibre or set of fibres coated with a cyclic or aromatic organic compound deposit with an aqueous solution comprising at least one flame-retardant compound, wherein the flame-retardant compound may be selected from among: potassium, sodium, phosphate, acetate, chloride, urea, and
   a post-drying drying step 220.

This has the advantage of enhancing the physicochemical properties of the carbonaceous material obtained. In fact, although the cyclic or aromatic organic compound, such as lignin or lignin derivative, may have flame retardant properties, the addition of a sizing step with a solution comprising at least one flame retardant compound makes it possible to improve the characteristics of the carbon material obtained.

The sizing steps 210 and post-sizing drying 220 may be repeated one or more times. Thus, it is possible to increase the amount of flame retardant associated with the fibre or to combine different treatments based on different substances.

Shaping (400)

The production process according to the invention may further comprise a shaping step 400, optionally coupled to a structuring step, of the highly carbonaceous material 2 by any shaping process such as: extrusion, compression, calendering, drawing or molding, at ambient temperature or with heat treatment. This shaping makes it possible to control precisely the final shape of the highly carbonaceous material obtained by the process according to the invention. It may also make it possible to control the porosity of the material produced.

The shaping step may, for example, be carried out at a temperature below 400° C. in the presence of a polymeric binder or at a temperature above 400° C. in the context of drawing, compression or calendering.

Graphitization (500)

The production process according to the invention may comprise, after the carbonization step 300, a graphitization step 500. This graphitization step 500 may be carried out at a temperature of between 1000° C. and 2800° C., preferably greater than or equal to 1100° C. The graphitization step 500 may, for example, last from 2 to 60 minutes, preferably from 2 to 20 minutes. This graphitization step 500 may comprise a gradual rise in temperature.

Post-Carbonization (600)

The production process according to the invention may further comprise, after the carbonization step 300, a sizing step 600 of contacting the highly carbonaceous material 2 with a solution of an organic component that may comprise at least one silane or silane derivative and/or at least one siloxane or siloxane derivative. This sizing step 600 may also be implemented after the graphitization step 500. A plasma, microwave and/or electrochemical treatment step may also be performed between the graphitization step 500 and the sizing step 600.

The sizing improves the integrity of the carbonaceous material and protects it from abrasion. The solution of the organic component is preferably an aqueous solution, an organic solution or an aqueous emulsion.

This sizing step improves the physicochemical properties of the material (e.g. protection against abrasion and improving the integrity of the component fibres) and has the advantage, in the context of the invention, of possibly being performed on a set of fibres, i.e. for example on a carbon fibre fabric.

According to another aspect, the invention relates to a fibre or a set of fibres covered with an organic deposit 30 as an intermediate product obtained after the thermal and dimensional stabilization step 200 of the production process according to the invention. The organic deposit is an aromatic or cyclic organic compound deposit. Preferably, the ratio of the weight of fibre to the weight of cyclic or aromatic organic compound is between 1/5 and 100/1, while the organic deposit covering the fibre or set of fibres comprises at least one cyclic organic compound or aromatic selected from: lignin or lignin derivatives, polysaccharides such as cellulose, starch, glycogen, amylose, amylopectin, dextran, hemicellulose, or fructose or glucose and their derivatives; pitch, naphthalene, phenanthrene, anthracene, pyrene or substituted polycyclic aromatic hydrocarbons such as naphthalene sulphonate; and the phenolic resin, phenoplast resin, or the polyepoxide resin.

This intermediate product preferably has a ratio of the weight of fibre to the aromatic or cyclic organic compound weight of between 1/5 and 100/1, preferably between 2/1 and 95/1.

According to another aspect, the invention relates to a highly carbonaceous material 2 that may be obtained by the production process according to the invention, and preferably obtained by the production process according to the invention.

Preferably and advantageously, this highly carbonaceous material 2 is bi-structured in order to include a structured part and an unstructured part. The structured part corresponds to the material resulting from the carbonization of the structured precursor 10 while the unstructured part corresponds to the material resulting from the carbonization of the structured precursor 15. Advantageously, these two highly carbonaceous parts may have different physico-chemical characteristics. The structured structure may be advantageous for the shaping of the structure but also for the electrical conductivity, in combination with an unstructured part providing a large specific surface area available for the electronic reactions/exchanges. Thus, the invention advantageously relates to a highly carbonaceous material 2, bi-structured in order to comprise a structured part comprising a carbonized fibre or a set of carbonized fibres, and an unstructured part comprising a carbonized cyclic organic or aromatic compound, and having an overall porosity greater than 5%, preferably greater than 10%.

In addition, the highly carbonaceous material 2 has an overall porosity greater than 5%, preferably greater than 10%. These products meet the expectations of industrialists looking for lighter carbon fibres that nevertheless have the mechanical properties required to meet the needs of, for example, the aerospace or automotive industries. In addition, the highly carbonaceous material obtained by the process according to the invention has the advantage of having a greater porosity than the highly carbonaceous materials obtained until now. This greater porosity has the advantage, as shown in the examples, of increasing the carbon yield obtainable by the addition of additives such as nanocarbon fillers. In addition, this greater porosity opens up the use of this material to many applications that can benefit from a larger overall surface area. Porosity is, for example, measured by direct methods (tomography, radiography, micrographs of section cutting) or indirect methods (measurement of density, weighing, . . . ). Preferably, the overall porosity is determined by density measurement with respect to the theoretical density. Advantageously, the structured part has a porosity of less than 40%, preferably less than 30%, while the unstructured part has a porosity greater than 7%, preferably greater than 10%. These porosities are advantageously determined by micrographs of section cutting.

Advantageously, the ratio of the volume of the structured part to the volume of the unstructured part is between 1/5 and 100/1. More preferably, the ratio of the volume of the structured part to the volume of the unstructured part is between 1/5 and 50/1. This ratio may be measured by various methods mastered by those skilled in the art, such as, for example, the analysis of optical microscope images of microtome sections of the highly carbonaceous material.

Advantageously, the highly carbonaceous material 2 comprises additional compounds such as metals in its unstructured part. The metals may be present in the highly carbonaceous material at a weight concentration of between 0.001% and 90%. More specifically, the metals may be present in the unstructured portion of the highly carbonaceous material at a weight concentration of between 0.1% and 90% while these same metals, or more broadly all metals, are present at a lower weight concentration of 5% in the structured part. This allows the highly carbonaceous material to exhibit, despite a lack of demarcation between its constituents, a heterogeneous structure that is particularly advantageous in the context of its use in electrochemical processes.

Advantageously, the highly carbonaceous material 2 is in the form of a carbon fibre, a twisted multi-filament, a non-twisted multi-filament, a set of non-woven carbon fibres, or of a set of woven carbon fibres. In fact, this highly carbonaceous material comprises, in addition to the structured part, an unstructured part capable of creating stronger links at the level of the contacts between the fibres (for example crossings). Thus, such a highly carbonaceous material 2 offers an improvement in the mechanical properties of the structured precursor (for example tear resistance).

According to another aspect, the invention relates to the use of the highly carbonaceous material 2 obtainable via the production process according to the invention, and preferably obtained by the production process according to the invention, for the production of parts made of thermoplastic or thermosetting composite materials.

Thus, according to another aspect, the invention relates to thermoplastic or thermosetting composite materials obtained from the fibres produced via the production process according to the invention. Advantageously, these thermoplastic or thermosetting composite materials have, for an identical volume, a weight less than 5% by weight than conventional thermoplastic or thermosetting composite materials.

In fact, the highly carbonaceous material 2 obtained by the process according to the invention may be used in conventional methods (for example injection, infusion, impregnation) of production of composite materials. It may be associated with a natural polymer resin or a synthetic polymer resin such as thermoplastic resins (for example polyamides, copolyamides, polyesters, copolyesthes, polyurethanes, polyethylenes, polyacetates, polyether sulphonates, polyimides, polysulphones, polyphenylenesulphones, polyolefins) or thermosetting resin (for example epoxides, unsaturated polyesters, vinyl esters, phenolic resins, polyimides).

According to another aspect, the invention relates to the use of the highly carbonaceous material 2 obtainable via the production process according to the invention, and preferably obtained by the production process according to the invention, for the production of parts that may be used in electrochemical processes. The highly carbonaceous materials according to the invention have a low resistance and are very good electronic conductors. In addition, they have a porosity, and therefore a specific surface, that is much higher than conventional carbon fibres. This is particularly related to the presence of a structured part and an unstructured part, wherein each has a different role to play in the electrochemical process.

The parts that may be used in electrochemical processes may, for example, be selected from the following list:
- anode for cathodic protection,
- electrode for fuel cells,
- electrode element for primary and rechargeable batteries,
- electric current collector for the anodes or cathodes of lithium or sodium batteries,
- electric current collector for lithium-sulphur batteries electric current collector for lithium-polymer batteries,
electrode element for lead acid batteries, especially for lead-acid or lead-carbon ultra-batteries,
electrode element for rechargeable lithium batteries,
supercapacitor electrode element,
catalytic support, in particular for the purification of air, and
catalytic support for lithium-air batteries.

The following examples illustrate the invention, but have no limiting character.

Example 1

Description of the Starting Materials:

The structured precursor used is based on multi-filament hydrocellulose fibres having a linear density of 88 mg per meter.

For the shaping of the unstructured precursor, the lignin was solubilized in an ethanol/water 60/40 mixture at 60° C. After 2 hours of stirring, the solution was cooled to ambient temperature. The precipitated fraction was filtered. The final solution contained 10% by weight of lignin.

Preparation of the Carbonaceous Material

Step 1: Impregnation

The hydrocellulose fibres constituting the structured precursor are impregnated in the lignin solution, i.e. the unstructured precursor, for 7 minutes.

Step 2: Drying

The lignin impregnated fibres were dried at 80° C. in a ventilated oven for 1 hour.

Step 5: Carbonization

The carbonization was carried out in a vertical static oven under a nitrogen atmosphere. A temperature ramp of 5° C. per minute was applied up to the temperature of 1200° C.

Characteristics of the Carbonaceous Material Obtained

The lignin deposition on the hydrocellulose fibre was 9% by weight. Quantification of weight lignin deposition may be obtained by weighing the hydrocellulose fibre before step 1 and then after step 2 of the drying.

Increased Carbon Yield

The carbon yield (CY) was calculated after the carbonization:

CY=(carbonaceous material per m/precursor per m)×100

Carbon yield results (after carbonization) are as follows:

| | |
|---|---|
| Hydrocellulose fibre, without lignin deposit or flame retardant (reference) | 8% |
| Hydrocellulose fibres, with 2% deposit of DAHP (Di Ammonium Hydrogen Phosphate) | 26% |
| Hydrocellulose fibres, with 9% lignin deposition, according to the invention | 25% |

These results show that lignin is a carbon source during pyrolysis and also acts as a flame retardant for hydrocellulose. Thus, the combination of hydrocellulose fibres with lignin in order to form, before carbonization, hydrocellulose fibres coated with a lignin deposit makes it possible to go from 8% to 25% of carbon yield, i.e. a multiplication by a factor of 3 or more, of carbon yield. Lignin also achieves a carbon yield equivalent to the carbon yield achieved with a conventional chemical used with cellulose.

Intimate Deposit and Constitution of a Highly Carbonaceous Material

Figure 2A:
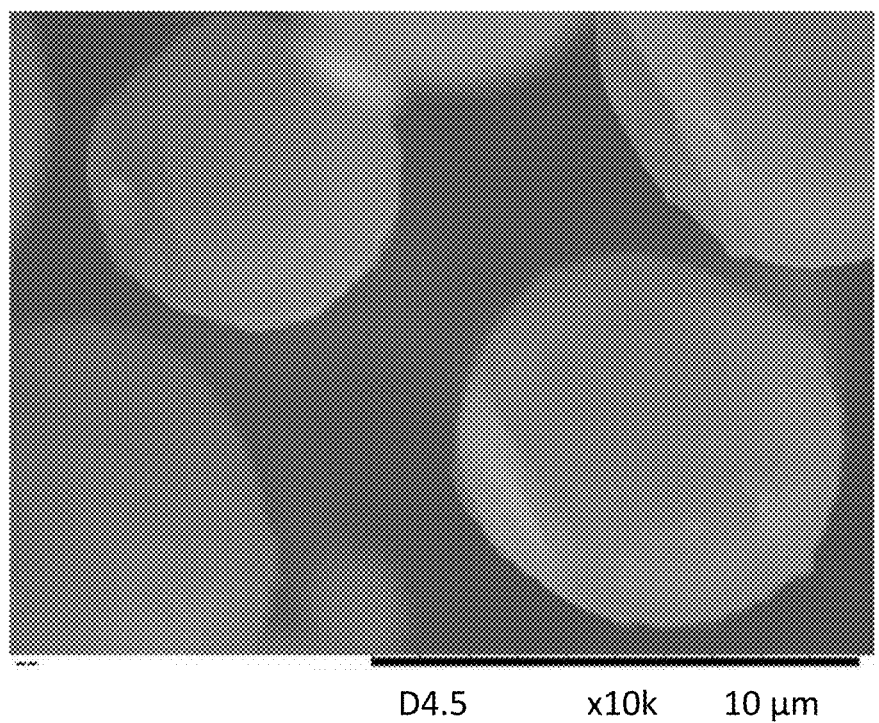
FIGS. 2A and 2B shows two images obtained by microscopy of a section of a carbonaceous material.
Figure 2B:
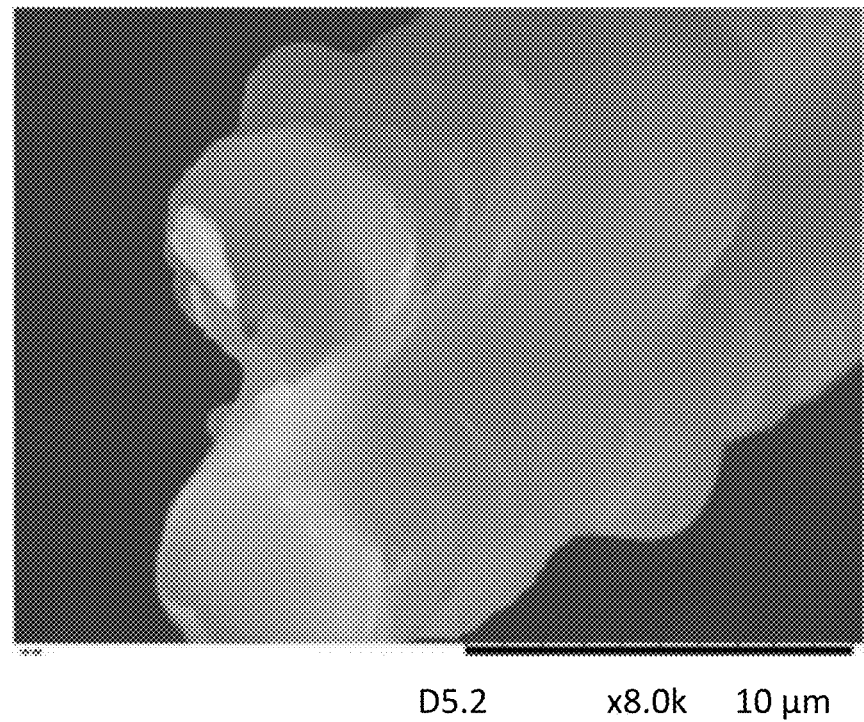

FIG. 2A shows an image obtained by scanning electron microscopy of a section of a carbonaceous material in the example, a carbon fibre, obtained after combination with DAHP (A), while image 2B shows an image obtained by scanning electron microscopy of the carbonaceous material obtained by the process according to the invention. FIG. 2B shows that the carbon deposit resulting from the lignin is strongly bound to the fibre surfaces and that it is impossible to identify by microscopy the interface between the structured part, namely the fibres, and the unstructured part, namely the carbon deposit from the lignin. On the contrary, FIG. 2A shows that the DAHP deposit does not allow the creation of this unstructured carbon weight around the structured part.

Thus the image of FIG. 2B illustrates the creation of an agglomerate forming a bi-structured highly carbonaceous material. There is no visible interface between carbon fibre from the hydrocellulose fibre and lignin after carbonization.

The carbon fibres of the carbonaceous material have a diameter of between 6 and 7 μm which is larger than that of the hydrocellulose fibres used as structured precursor.

Example 2

The deposition of lignin was carried out as in Example 1, but on hydrocellulose fibres with 0.2% of CNT added. The same protocol was also applied for carbonization.

Characteristics of the Carbonaceous Material Obtained

Carbon yield results (after carbonization) are as follows:

| | |
|---|---|
| Hydrocellulose fibre, no lignin deposit or flame retardant (reference) | 8% |
| Hydrocellulose fibre, no lignin deposit or flame retardant, with 0.2% NTC (comparative) | 9% |
| Hydrocellulose fibres, with 9% lignin deposition, according to the invention | 25% |
| Hydrocellulose fibres, with 9% lignin deposit without flame retardant substance, with 0.2% of CNT, according to the invention | 35% |

These results show that the addition to the unstructured precursor of carbon nanofillers such as CNT may be really effective and improve the carbon yield provided to comply with the process according to the invention including the combination of an unstructured precursor comprising a cyclic or aromatic organic compound such as lignin.

In addition, the addition of carbon nanotubes in the unstructured precursor containing the lignin makes it possible to increase the carbon yield further and to reach carbon yields of 35%, i.e. a multiplication by a factor of 4 or more, of carbon yield.

These examples show that the treatment of precursor structured with an unstructured precursor comprising a cyclic or aromatic organic compound such as lignin makes it possible to increase the carbon yield and the fixing of additional compounds such as CNT.

Thus, the present invention comprises the use of a combination of two precursors in order to obtain a highly carbonaceous material with a higher carbon yield.

The invention claimed is:

1. A process for production of a highly carbonaceous material, wherein the process comprises combining a structured precursor comprising a fibre or a set of fibres and a unstructured precursor in the form of a fluid,
wherein the fluid has a viscosity that is greater than 500 mPa·s$^{-1}$ and less than 45,000 mPa·s$^{-1}$ at the temperature at which the combination step takes place, and comprises at least one cyclic organic or aromatic compound in the molten state or in solution at a concentration by weight of less than or equal to 65%, wherein the at least one cyclic organic or aromatic compound has a weight percentage of carbon greater than 40% with a molecular weight greater that 500 g/mole, wherein the combination step produces a combined precursor corresponding to the structured precursor covered by the unstructured precursor, wherein the process further comprises the following steps:

a step of thermal and dimensional stabilization of the combined precursor to produce a fibre or a set of fibres covered with a cyclic or aromatic organic compound deposit, and a step of carbonization of the fibre or set of fibres covered with a cyclic or aromatic organic compound deposit to produce a highly carbonaceous material.

2. The process according to claim 1, wherein the unstructured precursor comprises between 5% and 50% by weight of the at least one cyclic organic or aromatic compound.

3. The process according to claim 1, wherein the fluid is an aqueous solution, an organic solution, or a mixture of both.

4. The process according to claim 1, wherein the fluid is a melted material.

5. The process according to claim 1, wherein the cyclic organic or aromatic compound has a molecular weight greater than 1000 g/mol.

6. The process according to claim 1, wherein the unstructured precursor further comprises at least one additional compound selected from: metal fillers, carbon-rich compounds, and organic particles.

7. The process according to claim 6, wherein the metal fillers comprise metals selected from the following metals: boron, silicon, germanium, arsenic, lithium, sodium, potassium, titanium, vanadium, manganese, iron, cobalt, nickel, molybdenum, aluminium and lead.

8. The process according to claim 6, wherein the carbon-rich compounds are selected from the following compounds: activated carbon, natural anthracite, synthetic anthracite, carbon black, natural graphite or synthetic graphite.

9. The process according to claim 1, wherein the structured precursor comprises a twisted multi-filament, a non-twisted multi-filament, a set of non-woven fibres, or a set of woven fibres.

10. The process according to claim 1, wherein the structured precursor comprises cellulose fibres, hydrocellulose fibres, lignin fibres, pitch fibres or PAN fibres.

11. The process according to claim 1, wherein the structured precursor and/or the unstructured precursor comprises carbonaceous nano-fillers, wherein the carbonaceous nano-fillers are present at a concentration between 0.0001% and 30% by weight.

12. The process according to claim 1, wherein the combination step and thermal and dimensional stabilization step are repeated one or more times.

13. The process according to claim 1, wherein the process further comprises a shaping step of the highly carbonaceous material.

14. The process according to claim 1, wherein the process further comprises a graphitization step.

* * * * *